Sept. 10, 1940.    E. I. GREEN ET AL    2,214,130
MEASUREMENT OF PHASE CHANGE AND ENVELOPE DELAY OF A TRANSMISSION LINE
Filed March 3, 1939    2 Sheets-Sheet 1
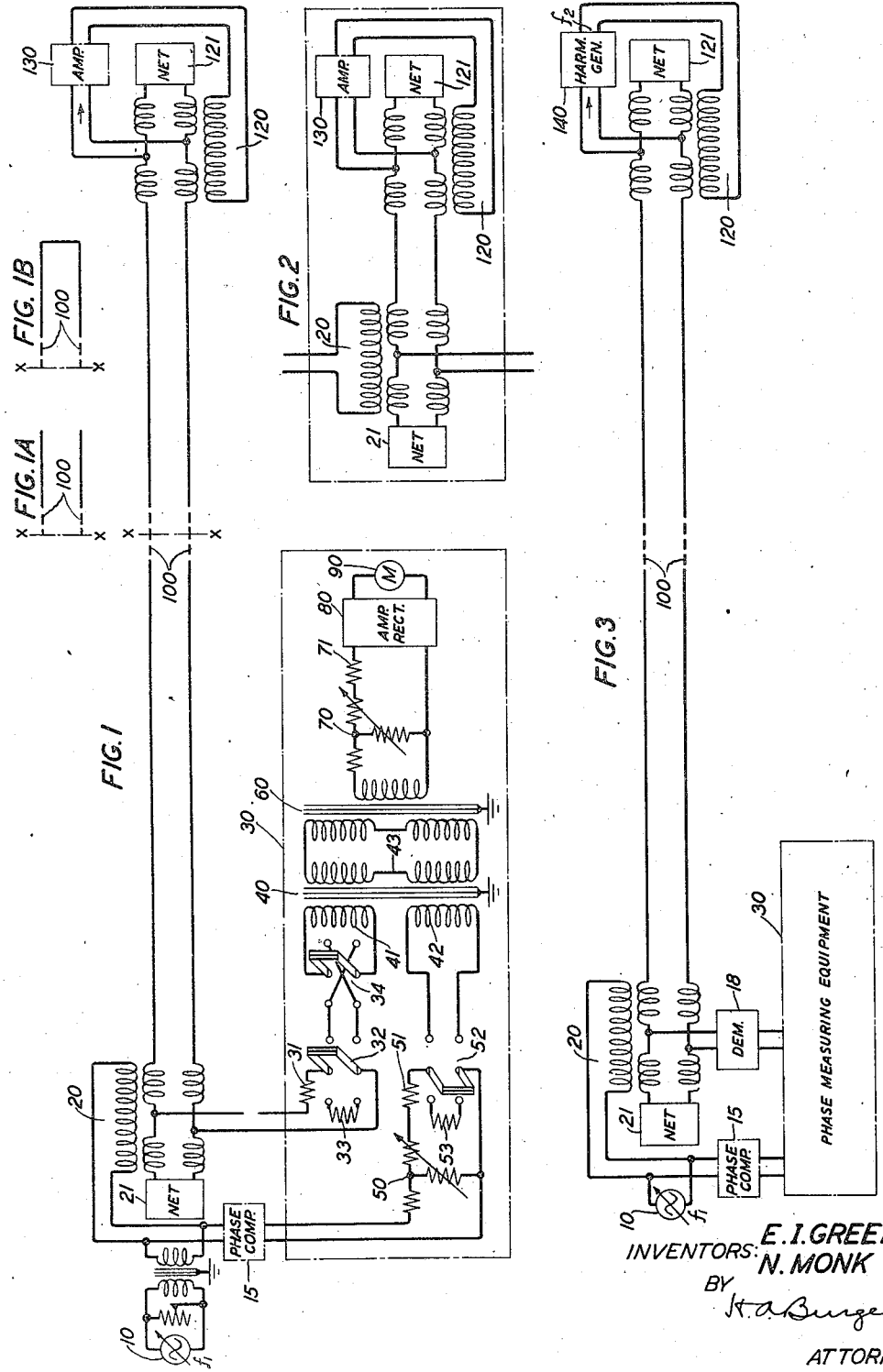
INVENTORS: E. I. GREEN
N. MONK
BY
H. A. Burgess
ATTORNEY Sept. 10, 1940.  E. I. GREEN ET AL  2,214,130
MEASUREMENT OF PHASE CHANGE AND ENVELOPE DELAY OF A TRANSMISSION LINE
Filed March 3, 1939  2 Sheets-Sheet 2
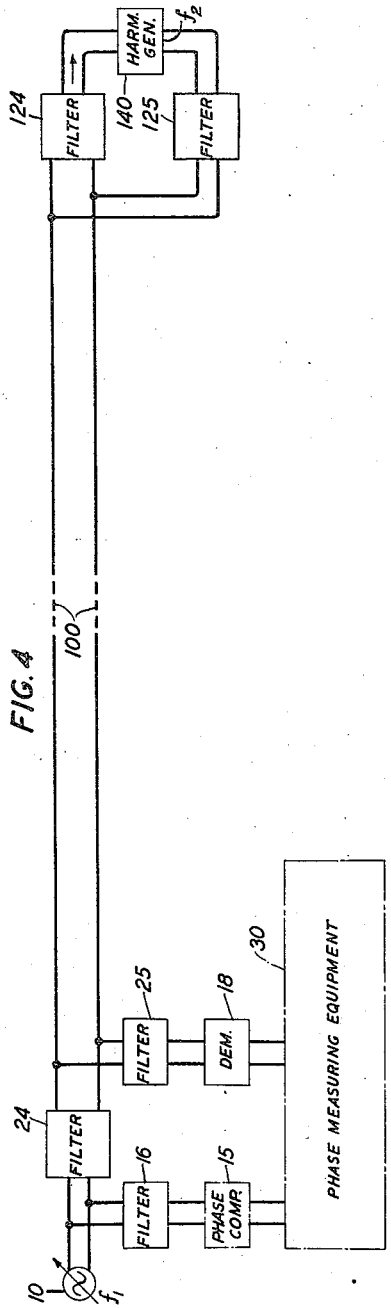
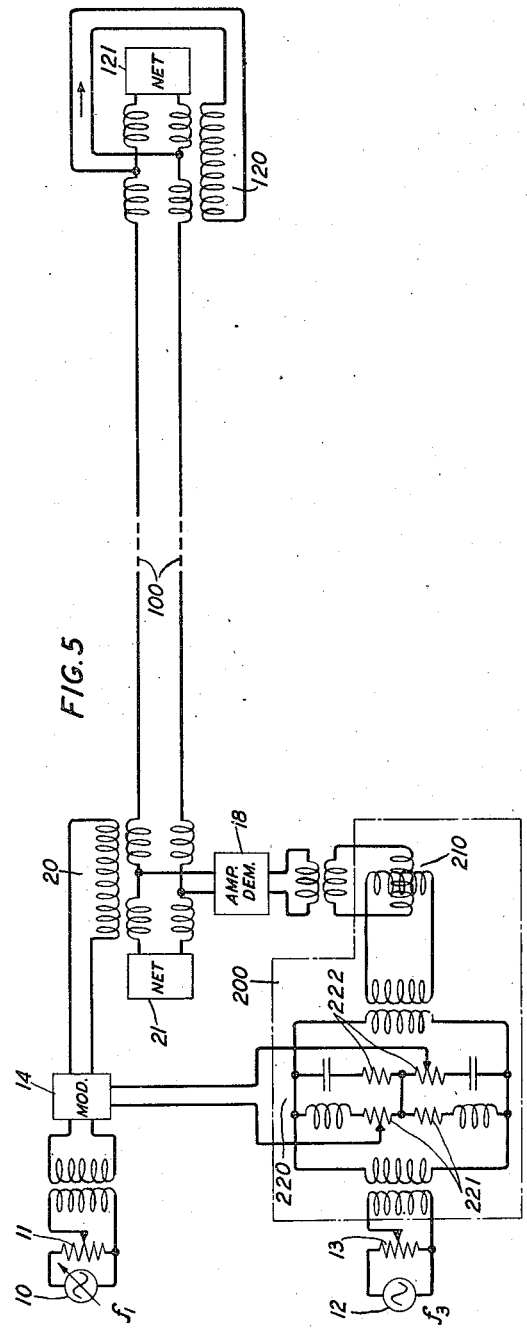
INVENTORS: E. I. GREEN
N. MONK
BY
*Jt. a. Burgess*
ATTORNEY Patented Sept. 10, 1940

2,214,130

UNITED STATES PATENT OFFICE 2,214,130

MEASUREMENT OF PHASE CHANGE AND ENVELOPE DELAY OF A TRANSMISSION LINE

Estill I. Green, Short Hills, N. J., and Newton Monk, New York, N. Y., assignors to Bell Telephone Laboratories, Incorporated, New York, N. Y., a corporation of New York Application March 3, 1939, Serial No. 259,494

21 Claims. (Cl. 179—175.3)

This invention relates to a method of and means for electrically testing and more particularly for measuring phase change and envelope delay of a transmission line, particularly where only one line, the transmission line alone, is available.

An object of this invention is to provide a simple and accurate system for measuring at various frequencies the insertion phase change due to an electrical circuit.

Another object is to provide an arrangement for measuring the insertion envelope delay which is defined as the slope of the insertion phase change characteristic of the circuit.

A further object is to provide a method and means for measuring phase change and envelope delay caused in transmission by comparing the current transmitted and returned over one circuit or path with that of the current before being transmitted over the circuit.

The method usually employed in measuring phase change of a transmission line, with the exception of the usual open-end short-circuit impedance method which has certain inherent limitations, requires that both ends of the circuit be available at one location. To overcome this difficulty it is usual to employ two similar transmission lines of equal characteristics and connect them together at the distant end.

This invention utilizes only one line and it is therefore particularly applicable where two similar circuits are not available. The arrangement here proposed for measuring phase change and envelope delay is such as, in effect, to bring the two ends of the line together.

In this arrangement a measuring alternating current of one frequency is transmitted from the near end to the far end of the line and a part of the current is returned from the far end to the near end where the phase of the returned current is compared with the phase of the originally transmitted current and the difference divided by two.

In a modified arrangement, two different frequencies for the opposite directions of transmission are used.

In the arrangement utilizing one frequency for the opposite directions of transmission, a part of the measuring current which reaches the far end of the line is returned to the near end without change of frequency, while in the arrangement where two different frequencies for the opposite directions of transmission are utilized a harmonic frequency of the original current is generated at the far end of the line which is returned to the near end. Suitable circuit networks for accomplishing this are employed at each end of the line. Where the same frequency is employed hybrid coils are used at each end of the line, at the near end for transmitting alternating current to the transmission line and for transmitting the returned part of the current to the measuring apparatus, and at the far end of the line for returning a part of the current. In the modified arrangement employing different frequencies for the opposite directions of transmission either hybrid coils or filter networks may be used at the two ends of the transmission line upon which the measurements are being made.

Envelope delay of a transmission line may be determined by measuring the phase change at two frequencies taken at a short interval apart and determining therefrom $$\frac{dB}{df}$$

which expression represents the rate of change of phase change. B equals the phase shift measured in cycles and $f$ the frequency measured in cycles per second. In the direct measuring method and means shown herein for determining envelope delay of a transmission line, a modulated high frequency current is transmitted in both directions over the line, demodulated at the near end of the line and compared by means of suitable envelope delay measuring apparatus with the original high frequency current. Reference is made to a paper entitled "Measurement of phase distortion" by Messrs. Nyquist and Brand published in the Bell System Technical Journal, July 1930, vol. IX, commencing on page 522, which deals with the measurement of phase distortion or delay distortion and is particularly concerned with measurements in telephone circuits. For this purpose use is made of the above-mentioned quantity "envelope delay" which is defined therein as the first derivative of the phase shift with respect to frequency.

A description of an embodiment chosen for illustrating this invention in which reference is made to the accompanying drawings follows:

Fig. 1 illustrates schematically an arrangement utilizing testing current of one frequency for measuring the phase change of a transmission line.

Figs. 1A and 1B illustrate substitute terminations of the far end of the transmission line which may take the place of that shown in Fig. 1.

Fig. 2 shows a circuit network which may be substituted for the phase compensator portion of Fig. 1.

Figs. 3 and 4 illustrate schematically two different arrangements simultaneously utilizing testing current of two different frequencies for measuring the phase change of a transmission line.

Fig. 5 illustrates schematically an arrangement for measuring the envelope delay of a transmission line.

Fig. 1 schematically illustrates one arrangement in simple form for measuring the phase change of a transmission line by utilizing alternating current of one frequency at any instant though the frequency of the source of current may be varied at will for making the tests or measurements with different frequencies over any desired frequency range. A source of variable frequency current, such as oscillator 10, supplies a test or measuring current which by means of the hybrid coil 20 with its balancing network 21 is transmitted to the transmission line 100. A second hybrid coil 120 with its balancing network 121 at the far end of the line removes a part of the transmitted test current from the line and through its conjugate pair of terminals returns some of the current to the line for return to the near end where it is removed by the near-end hybrid coil, a pair of whose terminals are connected to the phase measuring equipment 30. The phase of the returned current is then compared with that of the current obtained directly from the source 10 by means of the phase measuring equipment 30. An amplifier 130 shown by the dot-dash rectangle at the far end of the line may be included in the circuit to increase the strength of the returned portion of the test current.

The returned test current is taken off the transmission line 100 by a circuit including an impedance 31 connecting with the near-end hybrid coil 20 and the central terminals of a double-pole double-throw switch 32 of the phase measuring equipment 30. One set of terminals of this switch 32 is connected to an impedance 33 and the other set of terminals to the reversing switch 34. The central terminals of the reversing switch are connected with one primary 41 of the three-winding transformer 40. Test current obtained directly from the source 10 is fed through artificial line 50, impedance 51, and double-pole double-throw switch 52 of which one set of terminals is connected to the impedance 53 and the other set of terminals to the second primary winding 42 of the three-winding transformer 40. The impedances 33 and 53 are provided to match the impedances of the respective primary windings of transformer 40. The secondary winding 43 of the transformer 40 is connected through a second transformer 60, artificial line 70, impedance 71, and vacuum tube amplifier-rectifier 80 with meter 90. Impedances 51 and 71 match the impedances of the circuit in which the artificial lines 50 and 70, respectively, terminate.

In order to make accurate measurements, the phase shift caused by the two halves of the transformer 40 are made equal.

The measuring circuit 30 is adapted for measuring current phase change and the impedances of the primary windings 41 and 42 should be small compared to the terminating impedances 31 and 51.

The phase change of the transmission line itself is determined by first measuring that of the hybrid coils and the other apparatus included in the circuit and next measuring the total of the line and the associated apparatus and then deducting the effect of the former. The phase change caused by the line above is equal to half of this difference.

The phase measuring equipment 30 here shown is similar to that disclosed in Patent 1,684,403, issued to W. P. Mason, September 18, 1928.

The operation of the measuring circuit in making the above-described measurements is as follows: An alternating current of any desired frequency generated by the oscillator 10 is transmitted through the near-end hybrid coil 20 to the transmission line 100 and also directly to the artificial line 50 of the measuring equipment 30. A part of the test current transmitted over the line 100 passes through the far-end hybrid coil 120 and is returned over the line 100 to the near-end hybrid coil 20 which transmits this portion of the current to the measuring equipment 30. By suitable manipulation of the measuring equipment, as described below, the phase change caused by the transmission line may be determined for different frequencies. With the switches 32 and 34 closed in the right-hand position and the switch 52 in the left-hand position, the value of the current in the output of the line 100 is indicated on the meter 90. By throwing the switches 32 and 52 to the opposite position, the output of the artificial line 50 is also indicated on the meter 90. The attenuation of the artificial line 50 is then adjusted until the amplitude of the output current is equal to the amplitude of the current in the output of the transmission line 100. The two currents acting alone will then produce the same deflection on the meter 90. This operation corresponds to the usual method of measuring loss and if the artificial line 50 is calibrated it may be read to give the loss in the transmission line 100. By throwing both of the switches 32 and 52 into the right-hand position and the reversing switch 34 into the left-hand position, the vector sum of the two equal currents will be indicated on the meter 90. By reversing the switch 34 the vector difference of the two equal currents will be indicated on the meter 90. With the reversing switch 34 in a position giving the larger reading on the meter 90, the calibrating artificial line 70 may be adjusted to produce sufficient attenuation to give the same reading on the meter as was obtained with the reversing swtich in the other position and the artificial line 70 cut out. The phase angle between the two currents can then be determined by the amount of artificial line inserted. A description similar to the above and also a mathematical exposition of the operation of the phase measuring equipment portion 30 of Fig. 1 is presented in Mason Patent 1,684,403, supra.

Figs. 1A and 1B illustrate alternative far-end terminations of the transmission line which may be substituted for that shown in Fig. 1 to the right of the dash-dot line $x$—$x$. The near-end transmitting and receiving circuits and the phase measuring equipment 30 remain the same as in Fig. 1.

Fig. 1A shows the far end of the transmission line open and Fig. 1B shows it short-circuited. In Fig. 1A the return current is reflected back over the line from the open far end with a phase displacement of 180 degrees due to the open circuit condition; while in Fig. 1B the returned current is reflected back from the short-circuited far end in phase with the transmitted current. These facts would be taken into account when operating the phase measuring equipment. While the arrangement shown in Fig. 1 may be more efficient and preferable, phase change measurements caused by the transmission line may be measured when it is terminated at the far end as described with these and other alternative terminations.

To avoid subtracting the phase change caused by the apparatus from the total measured phase change to determine the phase change of the transmission line, a phase compensator 15 shown by the dash-dot rectangle at the near end of the line may be employed, the phase change of which exactly neutralizes the phase change of the apparatus. Such phase compensators are well known and their networks may be readily built up to neutralize the phase change caused by the circuits and apparatus with which they are used. If desired, compensating apparatus identical with that used at each end of the line as indicated in Fig. 2 may be substituted for phase compensator 15. With either phase compensating arrangement connected in the circuit as illustrated, the measurements of phase change of the transmission line may be obtained directly by halving the total measured phase change.

Fig. 2 shows a compensating network consisting of a duplication of the apparatus elements at each end of the transmission line 100, as shown in Fig. 1, comprising the near-end hybrid coil 20 and its balancing network 21, and the far-end hybrid coil 120 and its balancing network 121, and also possibly the amplifier 130 which may or may not be employed in the current returning circuit arrangement.

Fig. 3 shows an arrangement which may be employed where the phase change of a transmission line varies linearly, or in some other known manner, with frequency. This arrangement utilizes two different frequencies for the opposite directions of transmission so that the problem of hybrid coil balance is eliminated. The source 10 of alternating test current is connected to the line through hybrid coil 20, having a balancing network 21 the same as in Fig. 1. At the far end, however, a part of the test current of frequency $f_1$, after being removed from the transmission line 100 by means of the hybrid coil 120 having a balancing network 121, is raised to some harmonic frequency, for example $2f_1$ or $f_2$ double that produced at the source 10, by means of a harmonic generator 140 before being returned through the conjugate terminals of the hybrid coil 120 to the transmission line 100. The current having the new frequency $f_2$ after passing back over the transmission line is demodulated at the near end to produce a current of the original frequency $f_1$ by means of a demodulator 18 before being transmitted to the phase measuring equipment 30. A phase compensator 15 or equivalent apparatus may also be employed in this arrangement to neutralize the phase change encountered in the various apparatus elements through which the circuit extends, as described in the description of Figs. 1 and 2. Since two frequencies are employed in this arrangement, the phase change introduced by the compensator must be correct for the phase change introduced at each frequency.

Since the method described in connection with Fig. 3 utilizes two frequencies for the opposite direction of transmission, it is possible to separate them by means of filters instead of hybrid coils.

Fig. 4 shows such an arrangement for phase change measurement in which filters are employed instead of hybrid coils. This arrangement operates in a manner similar to that of Fig. 3 and also since two frequencies are used, the phase change of the transmission line being measured must vary linearly with frequency. Where measurements at more than one frequency are desired, the filters employed may be of the low-pass and high-pass type, the low-pass being used to pass all frequencies up to frequency $f_1$ and the high-pass to pass the frequencies above frequency $f_2$. Where such filters are used, the frequency range over which measurements may be obtained, using the $n$th harmonic is $$\frac{f_1}{n} \text{ to } f_1$$

Fig. 4 which, as stated above, employs filters instead of hybrid coils as a means for separating the two frequencies used for the opposite directions of transmission, is otherwise quite similar to Fig. 3. The source 10 produces an alternating test current of a given frequency $f_1$ which is transmitted through filter 24 to the transmission line 100 and through the far-end filter 124 and to the harmonic generator 140 from which a harmonic frequency $2f_1$ or $f_2$ is transmitted through filter 125 back to the transmission line 100, over which it is returned to the near end. At the near end filter 25 transmits the returned current having a frequency $f_2$ to demodulator 18 from which a frequency $f_1$ is transmitted to the phase measuring equipment 30. The phase measuring equipment may be the same as shown in Fig. 1 or any other suitable arrangement. Test current of the original frequency $f_1$ is transmitted from the source 10 by filter 16 through phase compensator 15 to the phase measuring equipment 30 where the phase relationship of the original and of the returned demodulated current are compared in the same manner as described in connection with Fig. 1.

Determination of phase change in a circuit or line over a wide range of frequencies may be made with the arrangements described above when the design of various elements involved is properly carried out. Where measurement at only a single frequency is required simpler arrangements will suffice.

The methods of phase comparison which might be employed in conjunction with the arrangements described usually determine the magnitude of the phase change at some angle between zero and 360 degrees. Where a long line is being considered such a measurement will not determine how many times the vector has rotated through the complete 360 degrees. To determine this approximate computation of the phase change of the transmission line may be made, or measurements may be started at a frequency sufficiently low that a complete cycle of rotation of the vector will be known not to have occurred. By gradually increasing the frequency, the rotations of the vector may be accurately followed and their number determined.

Envelope delay of a transmission line may also be determined by the arrangement described by measuring the phase change at two frequencies taken at a short interval apart and determining therefrom $$\frac{dB}{df}$$

which expression as already stated represents the rate of change of phase change; B equaling the phase shift measured in cycles and $f$ the frequency measured in cycles per second.

Another method in which the envelope delay of a transmission line is directly determined and which is applicable to this invention is described in Patent 1,645,618 issued to H. Nyquist, October 18, 1927. In the Nyquist arrangement a carrier frequency is modulated with a standard low frequency and then transmitted through the system to be measured. At the receiving end an ordinary amplifier-detector is used to demodulate the received current and obtain the modulating frequency. This returned current is then compared in phase with a reference frequency which is obtained from the original source. In order to avoid including the phase change effects of the measuring apparatus itself, the change in phase shift so measured through the system under consideration is compared with a similar measurement made with an artificial resistance line substituted for the system under test. The difference of these two is the phase shift suffered in the system by the envelope of the modulated current; and the envelope delay of the system in seconds at the carrier frequency is $$D = \frac{1}{360} \frac{M}{P}$$

where $P$ = the modulating frequency in cycles per second and $M$ = the phase shift of the envelope of the modulated wave in degrees.

An arrangement for making such measurements in accordance with the principles of the present invention is illustrated in Fig. 5 which is generally similar to Fig. 1 of the Nyquist Patent 1,645,618, supra except that the transmission line 100 and associated hybrid coils 20 and 120, and their balancing networks 21 and 121, respectively, are substituted for the "system to be measured" shown by the dotted box 21 of the Nyquist patent. The envelope delay of the transmission line 100 is measured as outlined in the Nyquist patent. However, since in this case the measuring current passes over the transmission line twice, the envelope delay actually measured is twice that of the transmission line.

Referring to Fig. 5, it is desired to measure the delay through the transmission line 100. An oscillator 10, adjustable as to frequency, is provided and its output goes as the carrier frequency current through potentiometer 11 to modulator 14, which may be similar to that shown in the Nyquist patent supra. This carrier current of frequency $f_1$ is modulated by a current of a standard low frequency $f_3$, for example, of 25 cycles per second, obtained from the source 12 through potentiometer 13. In the output of the modulator 14 the low frequency component, 25 cycles, is suppressed and the output current after passing through hybrid coil 20 passes over the line 100 through hybrid coil 120, back to the line through the conjugate terminals of hybrid coil 120, back over the line and through hybrid coil 20 to amplifier-demodulator 18. This amplifier-demodulator may be similar to the amplifier-demodular arrangement shown in Fig. 1 of the Nyquist patent supra. The output current from the amplifier-demodulator 18 is of a frequency of 25 cycles.

A dynamometer detector 210 is provided which has two windings, one receiving the 25 cycle current directly from the source 12 through the phase shifter 220, and the other receiving 25 cycle current from the amplifier-demodulator 18. The dynamometer detector 210 and the phase shifter 220 may be similar to those shown in Fig. 1 of the Nyquist patent supra labeled DM and PS, respectively.

As explained in the Nyquist patent supra, the phase shifter 220 is calibrated. A phase shift of 360 degrees will correspond to the time of one cycle of the modulating 25 cycle current, that is, it will correspond to $\frac{1}{25}$ second of time. If there are 40 steps in the phase shifter, each step will correspond to 0.001 second of time and 9 degrees of angular phase shift. The time step referred to, namely 0.001 second of time, is convenient. Inasmuch as phase shifts and delays are here measured by using zero readings on the dynamometer, it is possible to arrange the apparatus so that the accuracy of the measurements is not substantially affected by variations in the transmission equivalent of the system being measured.

The procedure for measuring the envelope delay at any particular frequency $f_1$ is as follows. A zero delay transducer as, for example, an artificial resistance line, is first substituted for the transmission line to be measured. This will necessitate temporarily bringing the hybrid coil 120 and its balancing network 121 to the near end of the line. This is of no particular disadvantage, however, since this measurement need only be made once for calibrating purposes. The oscillator 12 is then adjusted to the frequency $f_3$ and the setting of the phase shifter 220 determined to produce a zero reading on the dynamometer. Let the reading of the phase shifter 220 for this measurement be $M_0$ in seconds of time, which represents the phase shift of the envelope of the modulated wave in passing through the measuring apparatus. The zero delay transducer is then removed and the line to be measured with its associated hybrid coils connected to the measuring apparatus, the hybrid coil 120 in this case being located at the far end of the line. The phase shifter 220 is again adjusted to produce zero reading on the dynamometer 210. If the reading of the phase shifter in this case is $M_1$, then the envelope delay of the line at the frequency $f_1$ is $$D_{f_1} = \frac{1}{2}(M_1 - M_0)$$

Any integral multiple of $\pi$ may not be shown in this measurement but this is of little consequence inasmuch as relative delay rather than absolute delay is generally of most interest.

If it is desired to obtain a curve of the relative delay plotted against frequency, this may be done in accordance with the procedure outlined in the Nyquist patent supra, which is fully explained therein starting on page 2, line 61, and continuing through line 88.

While the several figures of the drawing show similar terminating arrangements, it is obvious that the near-end and far-end arrangements may be different. Also, the general principles disclosed herein may be embodied in other organizations widely different from those illustrated without departing from the spirit of the invention as defined in the claims.

What is claimed is:

1. The method of measuring phase change in a transmission circuit which comprises transmitting an alternating current of one frequency over the circuit from the near end to the far end and back from the far end to the near end, and comparing the phase of the returned current with that of the current as originally transmitted.

2. The method of measuring phase change in a transmission circuit which comprises transmitting an alternating current over the circuit from the near end to the far end, reflecting said current back from the far end to the near end, and comparing the phase of the return current with that of the current as originally transmitted.

3. The method of measuring phase change in a transmission circuit which comprises transmitting an alternating current of one frequency over the circuit from the near end to the far end, amplifying said current at the far end, returning the amplified current from the far end back to the near end, and comparing the phase of the return current with that of the current as originally transmitted.

4. The method of measuring the phase change in a transmission circuit which comprises transmitting an alternating current of one frequency over the circuit from the near end to the far end, reflecting said current without change of phase at the far end, transmitting said reflecting current back to the near end, and comparing the phase of the returned current with that of the current as originally transmitted.

5. The method of measuring the phase change in a transmission circuit which comprises transmitting an alternating current of one frequency over the circuit from the near end to the far end, reflecting it 180 degrees out of phase at the far end, transmitting said reflected current from the far end to the near end, and comparing the phase of the return current with that of the current as originally transmitted.

6. An arrangement for measuring the phase change in a transmission line comprising means for generating a measuring alternating current, means for connecting the near end of said line with said generating means for transmitting said current to said line, a termination at the far end of said line for reflecting current back over the line to the near end, phase measuring apparatus at the near end of said line, means for connecting the said generating means with said phase measuring apparatus for applying measuring current thereto, and means for connecting the near end of the said line with the said phase measuring apparatus for applying returned current from the line thereto.

7. An arrangement for measuring the phase change in a transmission line comprising an oscillator for generating a measuring alternating current, a near-end hybrid coil with balancing network connecting the near end of said line with said oscillator for transmitting said current to said line, means at the far end of said line for returning said current back over the line to the near end, a phase compensator, and phase measuring apparatus connected with said near-end hybrid coil and with said oscillator through said phase compensator.

8. An arrangement for measuring the phase change in a transmission line comprising means for generating a measuring alternating current, means for transmitting said measuring current to said line, means at the far end of said line for returning current back over the line to the near end, phase compensating means for neutralizing phase changes caused by elements other than said line, phase measuring apparatus for comparing the phase relationship of the said measuring current before transmission with that after transmission, means for connecting said phase measuring apparatus with said transmission line, and means for connecting said source of measuring current and said phase compensating means with said measuring apparatus.

9. An arrangement for measuring the phase change of a transmission line comprising an oscillator for generating a measuring alternating current, a near-end hybrid coil with balancing network connecting the near end of said line to said oscillator for transmitting said current to said line, means at the far end of said line for returning said current back over the line to the near end, and phase measuring apparatus connected with said near-end hybrid coil and with said oscillator.

10. An arrangement for measuring the phase change in a transmission line comprising an oscillator for generating a measuring alternating current, means for connecting the near end of said line with said generating means for transmitting said current to said line, means including an amplifier at the far end of said line for returning the current back over the line to the near end, phase measuring apparatus at the near end of the said line, and means for connecting the near end of said line and said generating means with said phase measuring apparatus.

11. An arrangement for measuring the phase change in a transmission line comprising an oscillator for generating a measuring alternating current, a near-end hybrid coil with balancing network connecting the near end of said line with said oscillator for transmitting said current to said line, a far-end hybrid coil with balancing networks terminating the far end of said line and having a conjugate pair of terminals of said coil arranged to return part of the current over the line to the near end, and measuring apparatus connected with said near-end hybrid coil and with said oscillator.

12. An arrangement for measuring the phase change in a transmission line comprising an oscillator for generating a measuring alternating current, a near-end hybrid coil with balancing network connecting the near end of said line with said oscillator for transmitting said current to said line, far-end termination of said line reflecting current back over the line to the near end, and phase measuring apparatus connected with said hybrid coil and with said oscillator.

13. An arrangement for measuring the phase change in a transmission line comprising an oscillator for generating a measuring alternating current, a near-end filter connecting the near end of said line with said oscillator for transmitting said current to said line, a far-end harmonic generator for producing a harmonic of the said alternating current, a far-end filter for transmitting said alternating current to said harmonic generator, a far-end filter for transmitting current having a harmonic frequency of said measuring current to the said transmission line for transmission from the far end to the near end, a near-end demodulator, a near-end filter connecting with the said line for transmitting a current of said harmonic frequency to said demodulator for reducing the returned current to a current having a frequency the same as that of the original measuring current, and phase measuring apparatus connected with said demodulator and said source of current.

14. An arrangement for measuring the phase change of a transmission line comprising an oscillator for generating a measuring alternating current, a near-end hybrid coil connecting the near-end of said line with the said oscillator for transmitting said current to said line, a far-end harmonic generator for producing a harmonic of said alternating current, a far-end hybrid coil for transmitting said alternating current to said harmonic generator and for transmitting a harmonic frequency of said measuring current from said harmonic generator to the said transmission line for transmission from the far end to the near end, a near-end demodulator, a phase compensator, and phase measuring apparatus connected with said near-end hybrid coil through said demodulator and with said oscillator through said compensator.

15. An arrangement for measuring phase change in a transmission line comprising an oscillator for generating a measuring alternating current, a near-end hybrid coil connecting the near end of said line with said oscillator for transmitting said current to said line, a far-end harmonic generator for producing a harmonic of said measuring current, a far-end hybrid coil for transmitting said measuring current to said harmonic generator and arranged to return a harmonic frequency of said measuring current to said transmission line for transmission from the far end to the near end, a near-end demodulator connected with said near-end hybrid coil for reducing the return current to a current having a frequency the same as that of the original measuring current, and phase measuring apparatus connecting with said demodulator and said source of measuring current.

16. The method of measuring envelope delay through a transmission circuit at a selected frequency of carrier current, which consists in modulating said carrier current by a standard low frequency current and applying the modulator output to the said circuit, transmitting the modulated current through said circuit from the near end to the far end and back from the far end to the near end, detecting the returned portion of the current to obtain the modulating frequency, and measuring its phase change at the frequency of the carrier current to ascertain the relative delay at that frequency.

17. The method of measuring envelope delay through a transmission circuit, which consists in modulating an input current with a standard low frequency current, transmitting the modulated current over the transmission circuit from the near end to the far end and from the far end to the near end, detecting the modulating component in the modulated current returned over said transmission circuit, making comparisons for phase relation between said modulating component and said current of standard low frequency at the near end of said transmission circuit, and noting the change of phase necessary to establish a certain standard phase relation for each frequency of carrier current transmitted.

18. The method of determining envelope delay in a transmission circuit, which consists in modulating a current of a given frequency by a standard low frequency current at the sending end, transmitting the modulated current over said transmission circuit to its far end and returning a part of the said modulated current over said circuit, and determining at the transmitting end the phase change of the modulations caused by transmission over said circuit.

19. Means for measuring envelope delay through a transmission circuit comprising a modulator with output connected to the near end of the transmission circuit, an oscillator of adjustable frequency connected to the modulator input, a source of standard frequency current to modulate the current from said oscillator, means for returning a portion of the products of modulation from the far end of the said transmission circuit to its near end, means for comparing two currents of the same frequency for their phase relation, a detector having its input connected with the near end of said transmission circuit and its output connected to said comparing means, means for deriving current from said source of standard frequency and applying said current to said comparing means, and a phase changer in one of said connections of said comparing means.

20. In the measurement of envelope delay through a transmission circuit, means to send a carrier current modulated by low frequency current through said transmission circuit from its near end to its far end and back to its near end, means for removing the returned modulations, means to detect the low frequency component in the transmission output, and means for making phase comparisons between the detector output and said low frequency current.

21. An arrangement for measuring the phase change in a transmission line comprising means for generating a measuring alternating current, means for transmitting said measuring current to said line, a termination at the far end of said line for reflecting current back over the line to the near end, phase compensating means for neutralizing phase changes caused by elements other than said line, phase measuring apparatus for comparing the phase relationship of the said measuring current before transmission with that after transmission, means for connecting said phase measuring apparatus with said transmission line, and means for connecting said source of measuring current and said phase compensating means with said measuring apparatus.

ESTILL I. GREEN.
NEWTON MONK.